Figure 1:
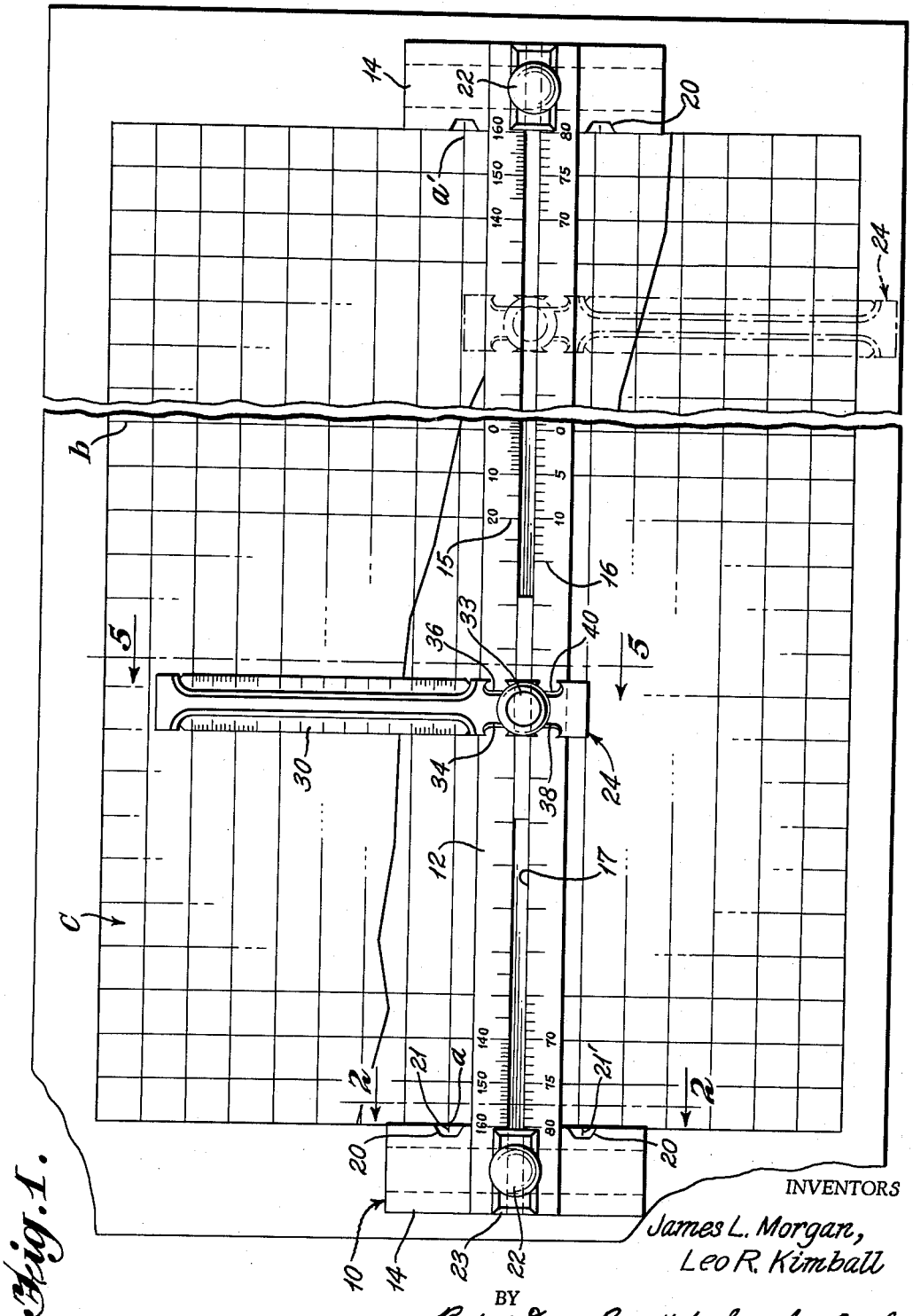

April 5, 1966 J. L. MORGAN ETAL 3,243,883
PLOTTING AID
Filed Jan. 18, 1963 2 Sheets-Sheet 1

INVENTORS
James L. Morgan,
Leo R. Kimball
BY
Burns, Doane, Benedict, Swecker & Mathis
ATTORNEYS

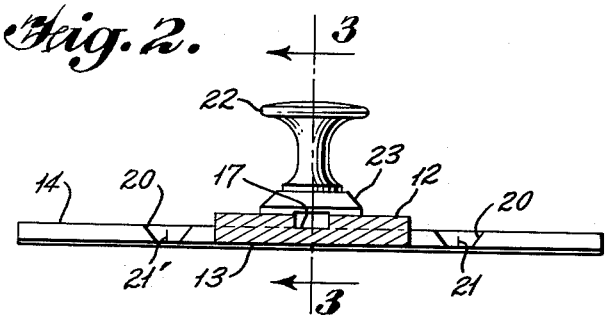
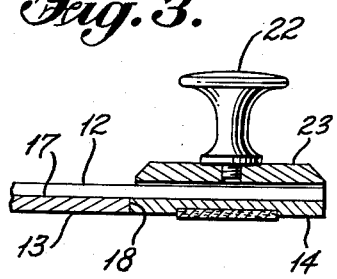
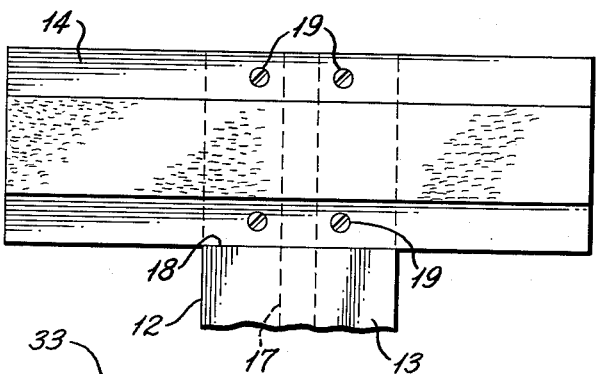
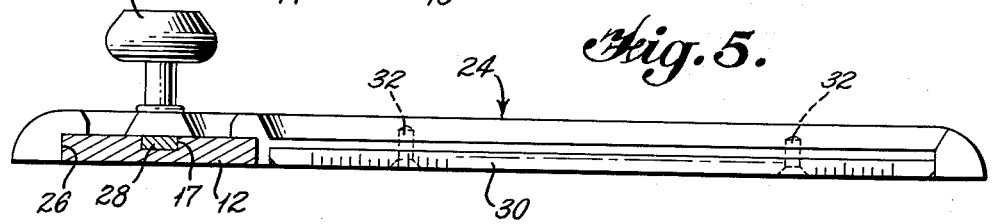
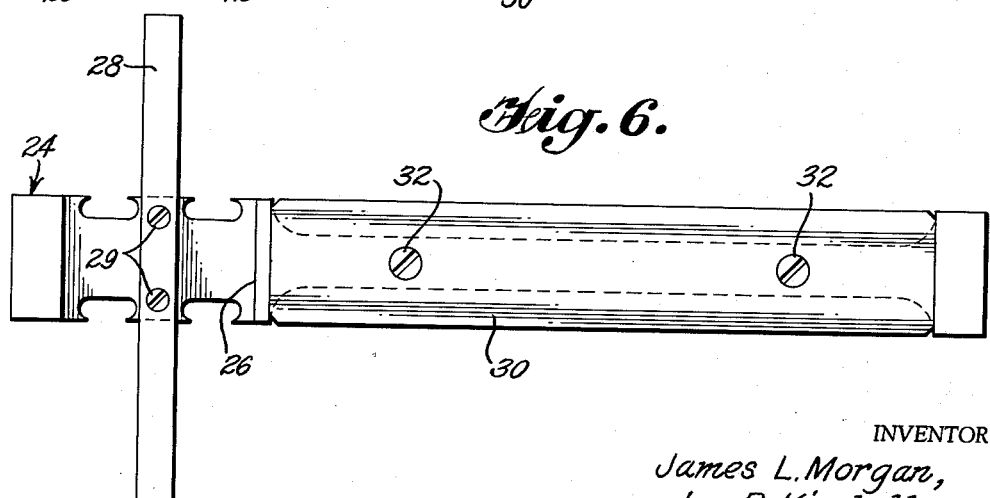

United States Patent Office 3,243,883
Patented Apr. 5, 1966

3,243,883
PLOTTING AID
James L. Morgan, 615 W. Highland Ave., and Leo R. Kimball, 619 W. Horner St., both of Ebensburg, Pa.
Filed Jan. 18, 1963, Ser. No. 252,429
1 Claim. (Cl. 33—103)

This invention relates generally to an instrument to be used as an aid in plotting surveyors' notes and more specifically to an instrument which enables a person to plot rod foresights directly on chart paper without any prior calculations. This instrument results in a considerable reduction of time necessary for plotting ground cross-sections and eliminates the possibility of human error in transposing the readings preparatory to plotting them on the chart.

It is an object of this invention to provide an instrument to be used as a plotting aid which is easy to use and requires a minimum of manipulations during use.

It is another object of this invention to provide an instrument for use as a plotting aid which enables a person to chart rod foresights directly on a chart eliminating note reduction.

It is a further object of this invention to provide an instrument for use as a plotting aid for applying centerline and offset distances directly on a chart which may be used with such accuracy so as to enable the device to be used in plotting topography.

These and other objects of the invention may be accomplished according to one embodiment wherein the plotting aid is comprised of an elongated bar having a base member connected at each end thereof. The base members are provided with means to maintain the device firmly on a flat surface. The base members may also be provided with handles for facilitating manipulation of the device.

The elongated bar includes a scale extending longitudinally the full length of the bar. A scale support is slideably mounted on the bar for movement relative thereto. The scale support with a further scale secured thereto is positioned so as to extend perpendicularly from the bar, from either side thereof as desired.

The elongated bar provides a horizontal scale which is placed at an appropriate location on chart paper. The scale support may be moved along the bar until positioned properly relative to the horizontal scale for plotting the readings as located on the scale secured to the scale support.

This embodiment of the invention is illustrated in the accompanying drawing in which FIG. 1 is a plan view of the plotting aid positioned on a chart with the alternate position of the scale support shown in broken lines.

FIG. 2 is a side-sectional view taken on line 2 of FIG. 1;
FIG. 3 is a sectional view taken on line 3 of FIG. 2;
FIG. 4 is a partial bottom view of one end of the plotting aid;
FIG. 5 is a sectional view taken on line 5 of FIG. 1; and
FIG. 6 is a bottom view of the scale support.

The plotting aid 10 includes an elongated bar 12 having a flat smooth bottom surface 13. Each end of the bar 12 is provided with a base member 14 for securely supporting the plotting aid. In this manner the bar 12 may be positioned horizontally on a piece of chart paper and is provided with means to locate readings relative to a centerline. For this purpose, scales 15 and 16 are provided adjacent each side of a longitudinal groove 17 on the upper surface of the bar 12 and extend the full length thereof. Each scale 15 and 16 has a zero mark at its center and is graduated to each end thereof. The zero mark of each of the scales 15 and 16 is located midway of the bar 12. The scale 15 may be graduated differently than the scale 16 to provide for more diversified use of the plotting aid. In the preferred embodiment, the scales are disclosed as being formed in the surface of the horizontal bar. The scales 15 and 16, however, may be formed of separate elements which are inserted into depressions in the bar adjacent the groove 17 or secured to the surface of the bar in any suitable manner.

The base members 14 are formed in the same manner and it will therefore suffice to describe only one. The base member 14 comprises a substantially flat rectangular element having a strip of material such as rubber or cork secured to the bottom surface. This will prevent the plotting aid from slipping on the surface when it is being used. Each base member 14 fits in a recess 18 in the bottom surface 13 at each end of the bar 12 and may be secured thereto by suitable means, such as screws 19. A pair of recesses 20 are formed in one edge of each base member and spaced so that a recess 20 is positioned on each side of the bar 12. The recesses 20 are provided with marks 21 and 21' to provide locating means as will be more fully explained below.

A handle 22 may be provided on each base member 14 for manipulation of the plotting aid 10. In the preferred embodiment, the handle 22 is secured threadably to a substantially rectangular pedestal 23. The pedestal 23 is secured to the surface of the bar 12 by a plurality of screws or other suitable means in bridging relation with the groove 17.

It is also necessary to provide means to locate the readings relative to a reference elevation. A scale support 24 is provided for this step. The scale support comprises an elongated member which is adapted to be connected to the bar 12 for movement relative thereto. The scale support 24 has a cavity 26 in the bottom surface and adjacent one end thereof. The cavity 26 conforms closely to the configuration of the cross-sectional shape of the bar 12 to embrace slidably the bar. A stabilizer 28 is secured in the cavity 26 substantially midway thereof by suitable means, such as screws 29. As best shown in FIG. 5, the scale support 24 fits snugly over the bar 12 with the stabilizer 28 slidably disposed in the groove 17. The stabilizer 28 is of sufficient length to prevent any pivotal movement of the scale support 24 relative to the bar 12.

The stabilizer 28 also provides means to maintain the scale support 24 on the bar 12 when the plotting aid is moved about. The scale support 24 may be slid to either end of the groove 17 thus projecting one end of the stabilizer 28 beneath the pedestal 23. In this position the scale support 24 will not fall away from the bar 12 when the plotting aid is moved about.

A scale 30 is removably secured to the support 24 by suitable means such as screws 32. In this manner the scale 30 may be removed and a different scale substituted therefor, if so desired. If the elevations which are to be charted are very large, it may be necessary to use a longer scale than ordinarily used.

The scale 30 is positioned on the support 24 so that the zero mark of the scale 30 is aligned with the mark in one of the recesses 20 which is positioned on the same side of the bar 12, as best shown in FIG. 1. A handle 33 may be provided to assist in moving the scale support 24 along the bar 12 in the groove 17.

A plurality of hairline notches 34, 36, 38 and 40 are formed in the edges of the scale support 24 above the cavity 26 to enable the scale support to be positioned relative to the scales 15 and 16 on the bar 12. When the scale support 24 is positioned operatively on the bar 12, a pair of notches 34 and 36 will be disposed above one of the scales 15 or 16 and the notches 38 and 40 will be disposed above the other of the scales.

To explain the use of the plotting aid in detail, a typical set of cross-section notes as recorded in the field is set forth below.

*Example*

| B.S. | H.I. | F.S. | Elev. |
|---|---|---|---|
| 4.5 | 1004.5 | ---------- | 1,000.0 BM 1 |

(50' 25' 15' 10' ℄ 15' 25' 50' 80')—Offset distances.
(+10.5 −4.0 −4.2 −6.2 −6.0 −6.2 −5.0 −5.5 +5.2)—Rod readings or Foresights.

Using the above example of cross-section notes, the first step is to mark a point on the left edge and on the right edge of the chart at a height of the instrument elevation 1004.5. These points are indicated at $a$ and $a'$ in FIG. 1 of the drawings. Once these points are plotted, the plotting aid 10 is then placed on the paper and aligned to the instrument elevation point by positioning the marks 21 and 21' on the base members 14 adjacent points $a$ and $a'$.

As described above, the zero mark of the scale 30 is aligned with the mark 21. It will thus be understood that the zero mark of the scale 30 is also aligned with the instrument height 1004.5.

The centerline is then marked at $(b)$ in FIG. 1. The scale support 24 is then slid to the left along the bar 12 until the hairline marker 34 is positioned on scale 15 to indicate a 50' offset distance. The foresight of +10.5 is then located on scale 30 on the scale support and this reading is marked on the chart C.

Since the next foresight is a negative reading, the scale support 24 is lifted from the bar 12 and reversed so that it extends downwardly therefrom, as shown in broken lines in FIG. 1. It is now necessary to relocate the horizontal scale relative to the instrument height so that the scale 30 is positioned properly. This is accomplished by merely shifting the bar 12 and the base members 14 until the other marks 21' are adjacent the instrument height marks $a$ and $a'$. The zero mark of the scale 30 is thus aligned with the instrument height.

The scale support is then slid to the right to position it at the next offset distance by positioning the hairline marker 40 on scale 30 to indicate a 25' offset distance.

The foresight of −4.0 is then located on scale 30 and marked on the chart C. This procedure is repeated until all foresights are plotted on the chart. The points may then be connected by straight lines to form a profile of the surface of the ground.

If desired, all the positive readings could be plotted before reversing the scale support 24 to plot the negative readings. This would avoid unnecessary manipulation of the plotting aid.

The plurality of hairline markers 34, 36, 38 and 40 permit positioning of the scale support 24 relative to either scale 15 or 16 regardless of the position of the scale support.

It will thus be understood that the present invention provides a simple plotting aid which reduces considerably the time required in plotting surveyors' notes, particularly in plotting cross-sections.

This device may also be used as an aid in plotting topography, if so desired.

The instrument is of simple construction with a minimum of moving parts. This results in an instrument which will maintain its accuracy throughout many years of use.

While the invention has been described in a certain embodiment, it is recognized that variations and changes may be made therein without departing from the invention as defined in the claim.

We claim:

A plotting aid for use in plotting surveyor notes comprising an elongated bar, said bar having a pair of scales thereon, a base member connected to said bar at each end thereof for supporting said bar, friction means on the base members to prevent accidental movement thereof, handle means on each of said base members for moving said plotting aid, means on each of said base members for positioning said bar in a selected position, a groove extending the length of said bar between said scales, said groove extending beneath the handle means at each end of the bar, a support having an elongated member extending perpendicular thereto and having portions projecting beyond each side thereof, said elongated member being slidably disposed in said groove to permit movement of said support longitudinally of said bar while preventing pivotal movement of said support relative to said bar, said portions of said elongated member being adapted to be moved into the grooves beneath the handle means to prevent upward movement of said support from said bar, said support having a plurality of guides thereon adapted to cooperate with a scale on said bar for positioning said support relative to said bar, a further scale removably mounted on said support extending perpendicularly from said bar, and said support being capable of being positioned on said bar so as to extend from either side of said bar.

References Cited by the Examiner

UNITED STATES PATENTS

| 842,047 | 1/1907 | Williams | 33—76 |
| 1,417,753 | 5/1922 | Lineweaver | 33—80 |
| 1,570,150 | 1/1926 | Hinds | 33—80 |
| 2,230,010 | 1/1941 | Owens | 33—107 |
| 2,522,908 | 9/1950 | Szabo | 33—107 |
| 2,805,479 | 9/1951 | Droste | 33—80 |

FOREIGN PATENTS 742,927   1/1956   Great Britain.

ISAAC LISANN, *Primary Examiner.*